United States Patent
Tissot

(12) 
(10) Patent No.: US 10,175,406 B2
(45) Date of Patent: Jan. 8, 2019

(54) COHERENT LIGHT WAVEGUIDE ILLUMINATION SYSTEM WITH SPECKLE NOISE REDUCER

(71) Applicant: L.E.S.S. Ltd, Ecublens (CH)

(72) Inventor: Yann Tissot, Lausanne (CH)

(73) Assignee: L.E.S.S. Ltd., Renens (CH)

( * ) Notice: Subject to any disclaimer, the term of this patent is extended or adjusted under 35 U.S.C. 154(b) by 67 days.

(21) Appl. No.: 14/904,941

(22) PCT Filed: Jul. 14, 2014

(86) PCT No.: PCT/IB2014/063098
§ 371 (c)(1),
(2) Date: Jan. 13, 2016

(87) PCT Pub. No.: WO2015/008211
PCT Pub. Date: Jan. 22, 2015

(65) Prior Publication Data
US 2016/0146998 A1    May 26, 2016

Related U.S. Application Data

(60) Provisional application No. 61/846,183, filed on Jul. 15, 2013.

(51) Int. Cl.
*F21V 8/00* (2006.01)
*G02B 27/48* (2006.01)

(52) U.S. Cl.
CPC .......... *G02B 6/001* (2013.01); *G02B 6/0003* (2013.01); *G02B 6/0041* (2013.01); *G02B 6/0076* (2013.01); *G02B 27/48* (2013.01)

(58) Field of Classification Search
CPC .... G02B 6/0003; G02B 6/001; G02B 6/0041; G02B 6/0043; G02B 27/48
See application file for complete search history.

(56) References Cited

U.S. PATENT DOCUMENTS

| 4,011,403 A | 3/1977 | Epstein et al. |
| 4,726,651 A | 2/1988 | Wei et al. |
| (Continued) | | |

FOREIGN PATENT DOCUMENTS

| EP | 2399508 A1 | 12/2011 |
| JP | H0527121 | 2/1993 |
| (Continued) | | |

OTHER PUBLICATIONS

Japanese Office Action with English Language Translation, dated Jan. 24, 2017, Japanese Application No. 2016-526738.
(Continued)

*Primary Examiner* — Daniel Petkovsek
(74) *Attorney, Agent, or Firm* — Womble Bond Dickinson (US) LLP

(57) ABSTRACT

A waveguide in which coherent light is to propagate along its longitudinal axis has formed therein a first scattering zone (103) that runs along the longitudinal axis and that is to scatter the propagating coherent light (105) out of the waveguide at a non-zero angle relative to the longitudinal axis. Means for vibrating a light spot of the coherent light relative to the waveguide, or means for dynamically changing a focus of the light spot, is provided, so that light coupling of the coherent light into the waveguide changes over time thereby generating different speckle patterns in the waveguide that overlap with the first scattering zone. Other embodiments are also described and claimed including one where a functional or diffusing coating (102) is provided that in combination with the first scattering zone yields a reduced speckle pattern.

14 Claims, 6 Drawing Sheets

(56) References Cited

U.S. PATENT DOCUMENTS

| | | | |
|---|---|---|---|
| 5,579,429 A * | 11/1996 | Naum | G02B 1/046 |
| | | | 252/301.17 |
| 5,596,671 A * | 1/1997 | Rockwell, III | G02B 6/001 |
| | | | 385/147 |
| 6,081,381 A | 6/2000 | Shalapenok et al. | |
| 6,398,778 B1 | 6/2002 | Gu et al. | |
| 6,714,185 B2 | 3/2004 | Kim et al. | |
| 7,024,094 B2 * | 4/2006 | Kimura | G02F 1/133621 |
| | | | 385/129 |
| 7,194,158 B2 * | 3/2007 | Schultheis | G02B 6/0043 |
| | | | 385/129 |
| 7,215,837 B2 * | 5/2007 | Trutna, Jr. | G02F 1/125 |
| | | | 385/31 |
| 7,437,035 B2 | 10/2008 | Carver et al. | |
| 7,502,160 B2 | 3/2009 | Aksyuk et al. | |
| 8,333,494 B2 * | 12/2012 | Kanade | G02B 6/001 |
| | | | 257/98 |
| 8,427,604 B2 * | 4/2013 | Nakai | G02B 6/0068 |
| | | | 349/139 |
| 8,897,612 B2 | 11/2014 | Logunov | |
| 9,541,694 B2 * | 1/2017 | Tissot | G02B 6/0003 |
| 2002/0018629 A1 | 2/2002 | Lieberman et al. | |
| 2007/0053634 A1 | 3/2007 | Carver et al. | |
| 2007/0223091 A1 | 9/2007 | Lee | |
| 2007/0251916 A1 | 11/2007 | Akahane et al. | |
| 2007/0263405 A1 | 11/2007 | Ng et al. | |
| 2010/0238374 A1 | 9/2010 | Ohse | |
| 2010/0271842 A1 | 10/2010 | Cheang et al. | |
| 2010/0283376 A1 | 11/2010 | Kanade et al. | |
| 2011/0267680 A1 | 11/2011 | Aschwanden | |
| 2013/0003343 A1 | 1/2013 | Sudarshanam et al. | |
| 2013/0010356 A1 | 1/2013 | Curtis et al. | |
| 2013/0272014 A1 | 10/2013 | Logunov et al. | |
| 2014/0098011 A1 | 4/2014 | Gollier | |
| 2014/0140090 A1 | 5/2014 | Logunov et al. | |

FOREIGN PATENT DOCUMENTS

| | | |
|---|---|---|
| JP | 2010218980 | 9/2010 |
| WO | WO-2009133111 | 11/2009 |
| WO | WO-2012146960 A1 | 11/2012 |
| WO | WO-2013052413 A1 | 4/2013 |
| WO | WO-2013066668 A1 | 5/2013 |
| WO | WO-2015031551 A1 | 3/2015 |

OTHER PUBLICATIONS

PCT International Preliminary Report on Patentability (dated Jan. 28, 2016), International Application No. PCT/IB2014/063098, International Filing Date—Jul. 14, 2014, 11.

PCT Invitation to Pay Additional Fees (dated Oct. 22, 2014), International Application No. PCT/IB2014/063098, International Filing Date—Jul. 14, 2014, 6 pages.

PCT International Search Report and Written Opinion (dated Jan. 8, 2015), International Application No. PCT/IB2014/063098, International Filing Date—Jul. 14, 2014, 16 pages.

Carver, G.E., et al., "A fiber grating based distributed light source", *Photonic Sensing Technologies*, Princeton Light Wave, Proc. of SPIE vol. 6371, 63710H-1 (2006), 7.

Spigulis, "Side-Emitting Fibers Brighten Our Work in New Ways", OSA, www.osa-opn.org, OPN Oct. 2005, (Oct. 1, 2005), 6.

* cited by examiner

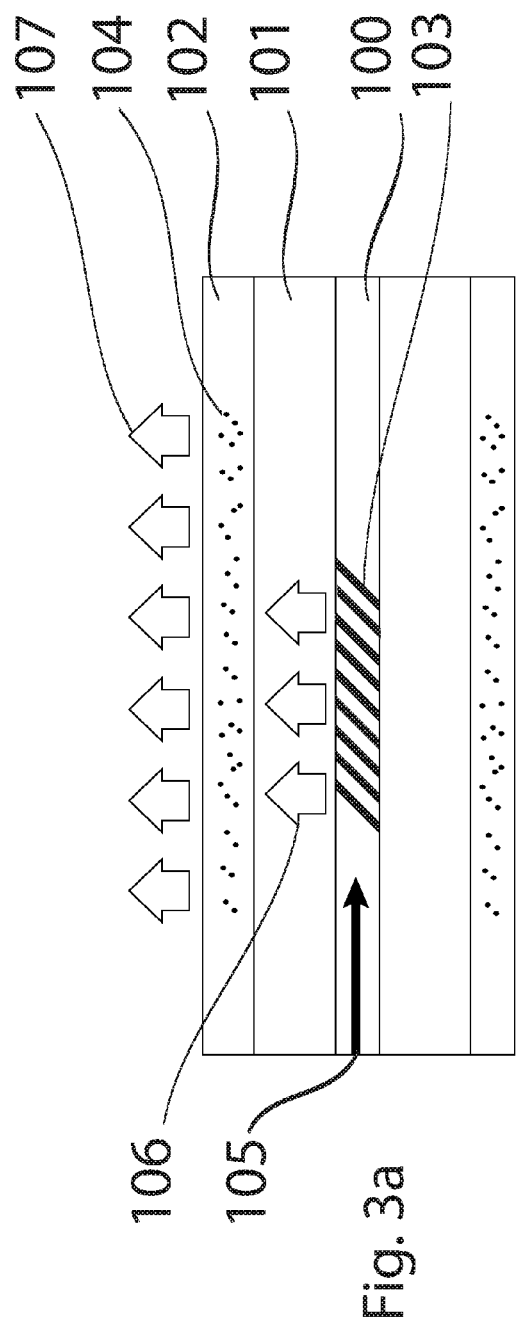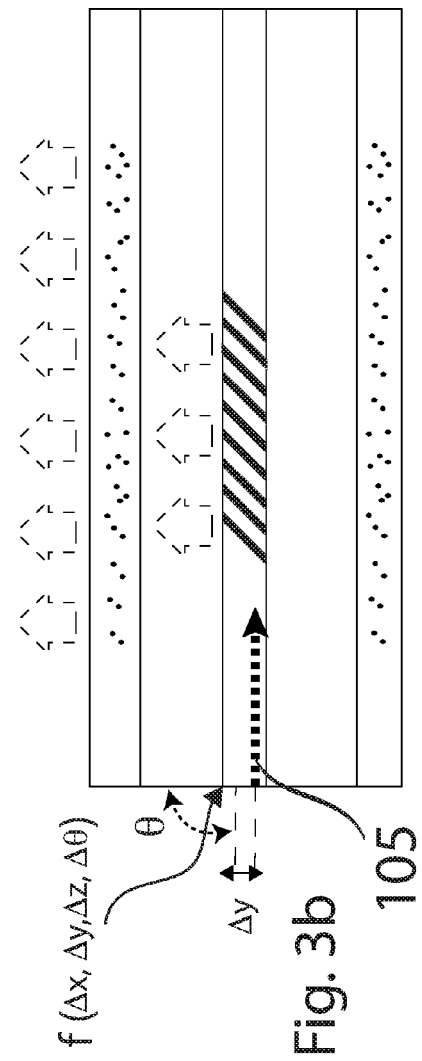

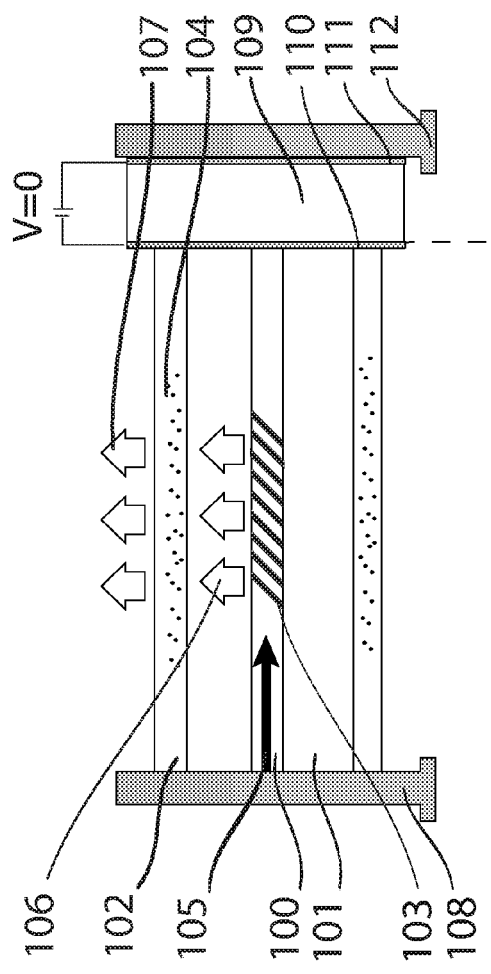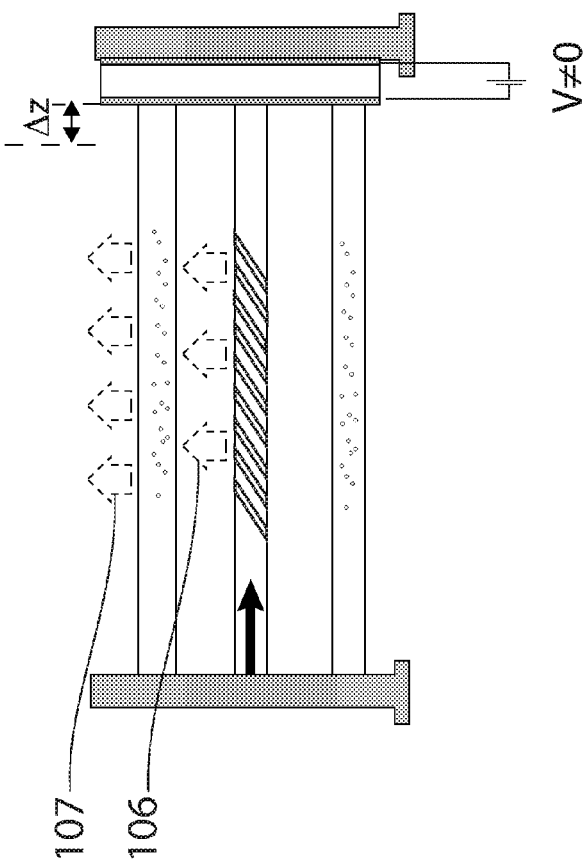

COHERENT LIGHT WAVEGUIDE ILLUMINATION SYSTEM WITH SPECKLE NOISE REDUCER

CROSS-REFERENCE TO RELATED APPLICATIONS

The present patent application is a national phase application of International Application No. PCT/IB2014/063098, filed Jul. 14, 2014, which claims priority to U.S. Application No. 61/846,183, filed Jul. 15, 2013, the disclosures of which are incorporated herein by reference.

An embodiment of the invention relates to an illumination device that exhibits a reduced degree of coherence and thus a low speckle noise contrast. Other embodiments are also described.

BACKGROUND

It is known that shining coherent light upon an illumination surface generates a shimmering illumination pattern also known as speckles. A speckle pattern arises from the local interferences generated between the incoming wavefront from a coherent light source and the scattered wavefront from an illumination surface for example as illustrated in FIG. 1. More specifically, the speckle pattern may originate from the superposition of random discrete wavefronts arising from contributing points in the illumination surface.

In the specific case of a multimode waveguide, it is also known that the propagation of coherent light in the core of the waveguide generates a strong speckled distribution of the intensity. The speckle pattern at the waveguide end may be produced by random interference between the various propagation modes.

The resulting random intensity pattern of these illumination systems is a drawback in many applications, e.g. inspection lighting, where the projected speckles are transformed into imaging noise.

A technique for reducing the speckle noise on an illumination surface involves dynamically decorrelating the speckles of the coherent light source (see FIG. 2A), i.e. by time-varying one or all of the following parameters: the polarization, the phase, and the wavelength of the coherent light source.

Another method is to dynamically decorrelate the projected speckles generated by the illumination surface or by the optical projection system (FIG. 2B). Typically, a moving optical element (e.g., a diffuser) is positioned within the optical path between the coherent light source and the illumination surface. The dynamic motion of this optical element in its entirety reduces the spatial coherence of the incident coherent light and thus a reduction of the overall speckle contrast is achieved. In this case, however, significant motion amplitudes are needed and are typically provided by, e.g. the mechanical rotation of a refractive element (U.S. Patent Application Publication No. 2007/0223091, PCT Patent Application Publication No. WO2009133111, and U.S. Pat. No. 6,081,381), the mechanical vibration or displacement of a plane diffuser (U.S. Patent Application Publication No. 2007/0251916, and U.S. Patent Application Publication No. 2011/0267680), screen vibration (U.S. Patent Application Publication No. 2013/0010356 A1), or the use of segmented mirrors (U.S. Pat. No. 7,502,160 B2).

Another method is to dynamically decorrelate the projection speckles by using at least two successive optical elements within the optical path and to move one of these elements in its entirety with respect to the other (FIG. 2C). In this case, much smaller motion amplitudes are needed to achieve the same reduction of the overall speckle contrast on the final illumination surface ("Speckle Removal by a Slowly Moving Diffuser associated with a motionless diffuser, J. Opt. Soc. Am., 61, pp. 847-851, 1971). The two optical elements may be, e.g. a refractive, diffractive or diffusing optical element.

Some of these methods need bulky, distinct optical elements or involve movement of an optical element in its entirety, which may be hard to integrate directly into a laser waveguide illumination system, such as, e.g. (U.S. Pat. No. 7,437,035 and PCT Patent Application Publication No. WO2012146960 A1) where the speckle pattern may be spread over an elongated surface. Others solutions including decorrelation of the coherent light source may not be suitable for certain applications.

SUMMARY

An embodiment of the invention is an illumination device or system with low speckle noise. The device employs a waveguide that transports coherent light (e.g., a laser light), with scattering structures inside the waveguide that redistribute the coherent light outside the waveguide. A second scattering structure inside a coating of the waveguide scatters the light that is primarily out-coupled from the core of the waveguide, outside the waveguide. Each of these elements, i.e. the waveguide, the first scattering structures inside the waveguide and the second scattering structures inside the coating of the waveguide, defines a distinct speckle pattern. In one embodiment, the static superposition of these distinct speckle patterns advantageously allows for an overall reduction of the spatial coherence of the "final" illumination light produced by the device. In another embodiment, causing motion of one of these speckle patterns with respect to another (vibration) enables a significant reduction in the overall speckle noise produced by the illumination device. Several integrated mechanisms for obtaining motions inside the waveguide illumination system are also described.

In one embodiment, the static or dynamic superposition of the successive speckle patterns occurs within the context of a single waveguide. Individual speckle sources may be one or more of the following: the waveguide itself (e.g., a multimode waveguide), a scattering structure integrated in the waveguide, and a scattering structure integrated in the coating of the waveguide. Methods for obtaining motion between one of these speckle sources with respect to another or with respect to a group of other speckle sources are described that may be able to reduce the speckle noise of the final illumination scheme. Examples for obtaining such motion include deformation of an optical element and changing the light coupling of a coherent light source to the waveguide.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness, a given figure may be used to illustrate the features of more than one embodiment of the invention, or more than one species of the invention, and not all elements in the figure may be required for a given embodiment species.

FIG. 3A is a section view of a coherent light waveguide device having a speckle reducer in accordance with an embodiment of the invention.

FIG. 3B shows an example speckle reducer in accordance with another embodiment of the invention, which relies on relative motion between the light source and the waveguide.

FIG. 4A and FIG. 4B are section views of a coherent light waveguide device with a speckle reducer in accordance with yet another embodiment of the invention.

DETAILED DESCRIPTION

Figure 1:
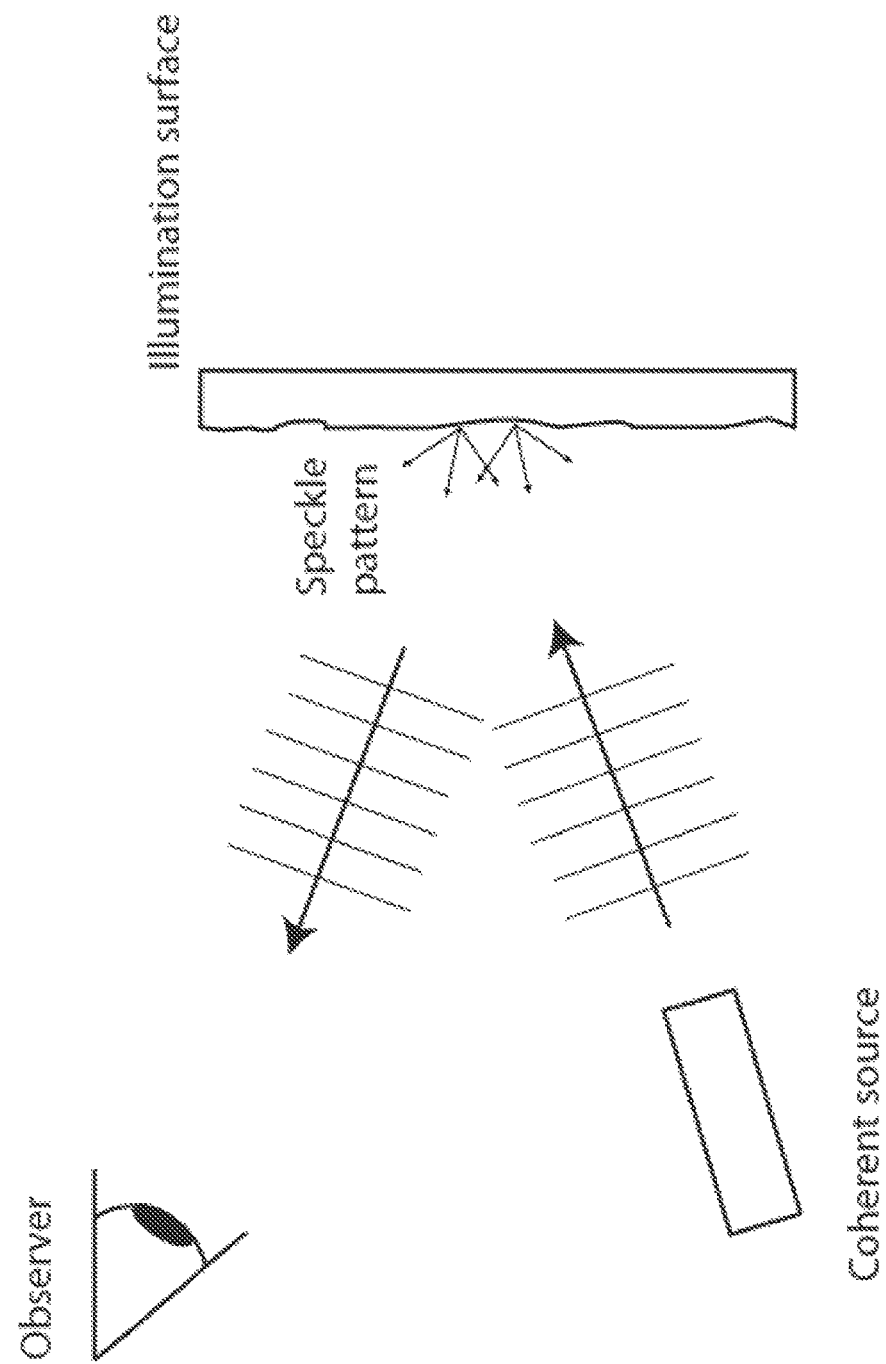
FIG. 1 illustrates the formation of speckles.
Figure 2A:
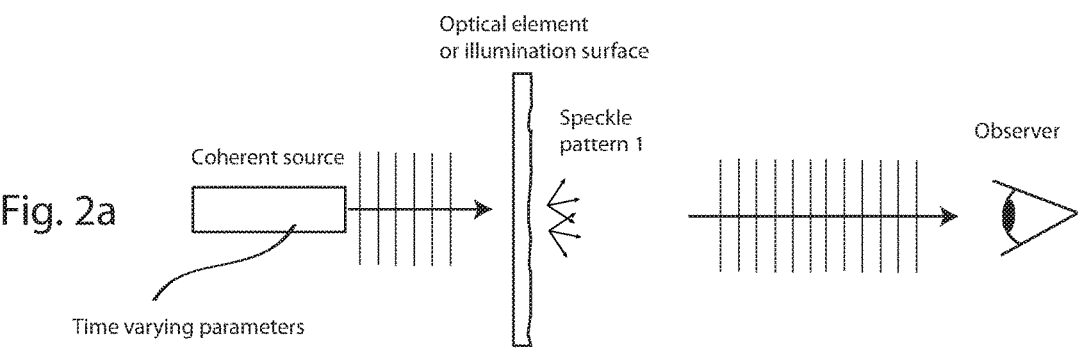
FIG. 2A depicts the use of time varying parameters in the generation of the light source, to alleviate speckle.
Figure 2B:
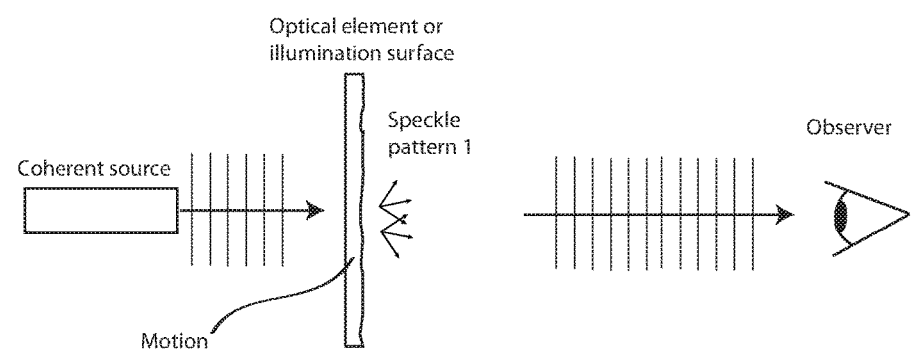
FIG. 2B illustrates an example of how moving an optical element can alleviate speckle.
Figure 2C:
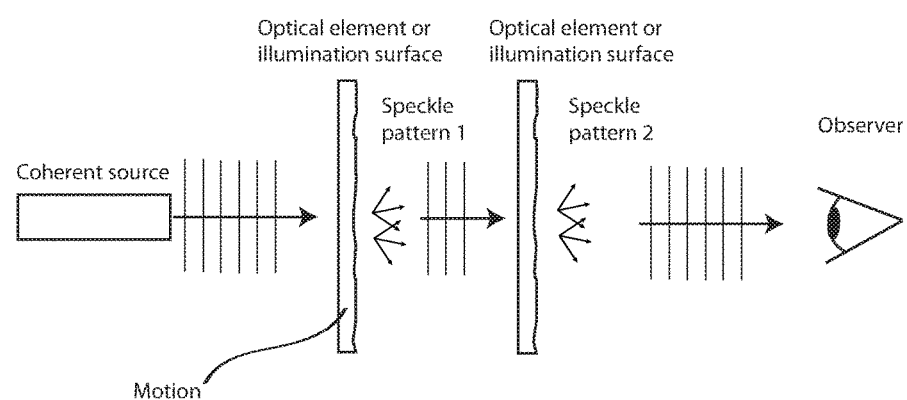
FIG. 2C shows another example of small motion of an optical element with respect to another to alleviate speckle.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Referring to FIGS. 3A, 3B, 4A, 4B, 5A, 5B, 6A and 6B, several embodiments of the illumination device are illustrated, where each uses a coherent light source that is coupled to a waveguide which has a core 100 and a cladding 101, resulting in a primary light 105 that propagates along the waveguide until it is out-coupled by a first scattering structure or scattering zone 103 inside the waveguide. The out-coupled light is then diffused out of the waveguide by a coating 102 via an integrated scattering center or zone 104 therein. Light that is scattered by a particular scattering zone (103 or 104) exhibits a distinct speckle pattern. Therefore, illumination light 107 that is scattered outside the waveguide exhibits a speckle pattern that is the superposition of a first speckle pattern arising from the first scattering zone 103 and a second speckle pattern arising from the second scattering zone 104.

The light source that produces the primary light 105 may be a coherent or partially coherent light source such as a laser or a super-luminescent light source. The invention is not limited to a specific wavelength or spectrum width and for instance can be located from the deep UV to far IR wavelength range. The coherent light source may be composed of multiple single wavelength coherent sources, e.g. lasers emitting red, green and blue light (R, G, B).

The primary light 105 is coupled into and guided by a waveguide. The waveguide may be a light pipe. Alternatively, the waveguide may be composed of a core or core layer 100 covered with a cladding or cladding layer 101 as shown in the figures here. The core medium is in contact with the cladding medium, and these are designed such that the primary light 105 can propagate in the core in the direction shown and along the longitudinal axis of the waveguide, for example via total internal reflection, as for example in a multi-mode optical fiber. The waveguide may be any suitable waveguide, such as an optical fiber, and may be a single clad fiber, a multi-clad fiber, or a photonic-crystal or micro-structured waveguide.

The waveguide has one or more scattering structures 103 formed therein as shown, which serve to re-direct the propagating primary light 105 out of a side surface of the waveguide, resulting in so-called scattered or out-coupled light 106. In other words, the propagating light is redirected to a desired non-zero angle (e.g., transverse or about 90 degrees) relative to the longitudinal or optical propagation axis of the waveguide, referenced here as scattered or out-coupled light 106.

The scattering structures may be particles or impurities directly integrated during fabrication of the waveguide (e.g., during the drawing of an optical fiber).

The scattering structures may be laser-induced structures; these may be formed through the application of external intense laser light to selected locations in the waveguide. The location, the shape, the size, the scattering strength, the tilt or orientation, and periodicity of the scattering structures, along and across (transverse to) the light propagation direction (longitudinal axis) in the waveguide can be selected, by adapting the focus, intensity and position of the external processing laser. Specifically, these parameters may be adapted, in accordance with an embodiment of the invention, to obtain a desired first speckle pattern in the out-coupled light 106.

Still referring to FIG. 3A, the waveguide device has a coating 102 in which one or more light scattering zones 104 are formed. The coating 102 may be made of a mixture of silicone or other suitable material such as epoxy, or a polymer matrix, mixed with light diffusing particles that are designed to interact with the out-coupled light 106. In accordance with an embodiment of the invention, the particles may be transparent, semi-transparent or/and may exhibit photo-luminescence. The refractive index, the size and the shape of the diffusing particles as well as their density and dispersion inside a medium such as an epoxy matrix, may be adapted to obtain a desired second speckle pattern, so as to reduce the overall speckle contrast upon final illumination outside the device, and perhaps to also obtain a desired illumination angle α (alpha) in the illumination light 107—see the section views in FIGS. 6A and 6B where a directional radiation pattern having a radial spread angle alpha, at a radial position of "12 o'clock", is shown. Other radial spread angles and radial positions are of course possible.

Figure 6A:
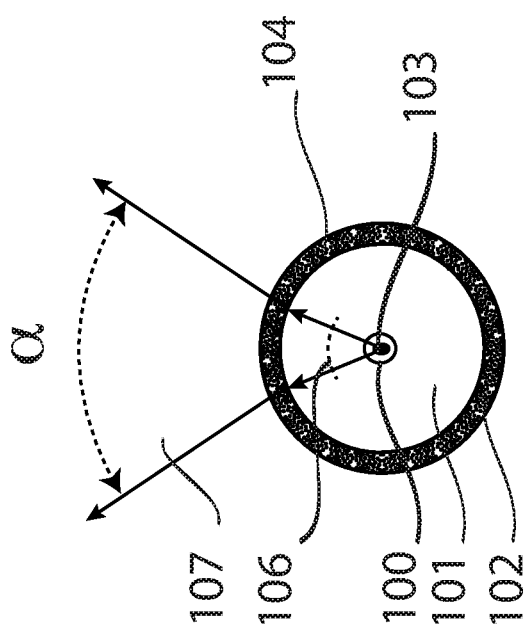
FIGS. 6A and 6B are section views of the coherent light waveguide device whose waveguide coating has large size and small size scattering centers, respectively.
Figure 6B:
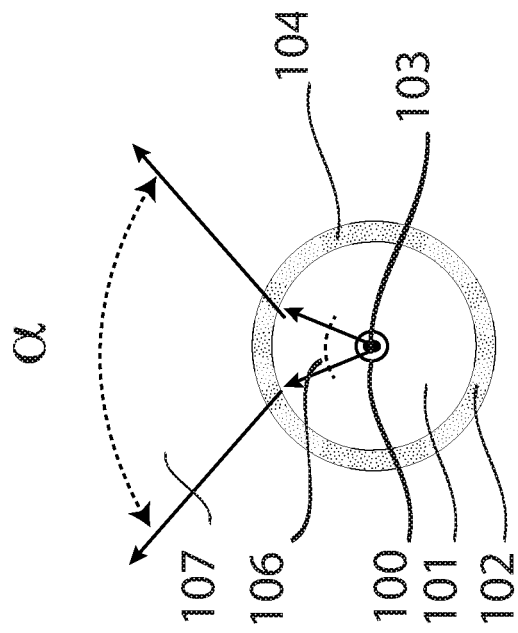

In the embodiments of FIGS. 3A, 6A and 6B, the coating 102 is shown as being formed on the outer surface of the waveguide, and in particular the outer surface of the cladding 101. There may be one or more intermediate material layers that are sandwiched between the coating 102 and the outer surface of the waveguide. In another embodiment, the coating 102 is formed in such a way that one or more of its sections are spaced apart from, and thus not in contact with, the outer surface of the waveguide, e.g. by an air gap.

In one embodiment, the coating 102 and the scattering zone 104 therein may be made of a mixture of material that exhibits electro-active properties and contains diffusing particles. Electro-active materials are materials that exhibit deformations or shape changes through the application of an electrical field. In this case, and referring now to FIG. 5A and FIG. 5B, intermediate electrodes 113-114 may be implemented in the inner surface and in the outer surface of a layer of electro-active material 115, that form part of the coating 102. This embodiment will be further described below, in connection with dynamic reduction techniques.

In another embodiment, the coating 102 may be made of a plain coating (not electro-active) and where its outer surface or inner surface is structured or textured (e.g., surface relief). In that case, no diffusing particles may be needed inside the coating. The size and periodicity of the structure at the surface of such a coating may be adapted to obtain the desired second speckle pattern. The surface relief may be formed by e.g., chemical etching or e.g., by laser ablation.

In order to reduce speckle noise in the illumination light 107, dynamic and static methods may be used, as described below (where such techniques may also be combined with the textured coating 102).

Dynamic Reduction

With dynamic reduction, a small amount of motion is imparted between one of the speckle sources with respect to the others, and which may be obtained by different methods that are described hereunder. The motion is "small" in that its amplitude and frequency need only be enough to result in the desired reduction in overall speckle contrast when the illumination light 107 that emerges from the device illuminates a nearby surface. In one embodiment, the minimum motion magnitude should be of the order of the particle size and/or of the order of the nanostructures pattern of the scattering zone. Therefore, a motion of a few microns to a few hundreds of microns may be sufficient in some cases. Note however that smaller motion amplitudes could also be sufficient, if very small particles are used. As to the frequency of the motion, this may depend on the inspection means. For example, if the observer is a human eye, then about 60 Hz may be sufficient. However if the observer is machine vision (camera), the frequency may be higher and may depend on the exposure integration time used.

a) Optically Changing the Mode Conditioning Inside the Waveguide (FIG. 3B)

Light coupling of the primary light 105 at one end of the waveguide is a function of position and tilt f (x,y,z, theta or q) of the coherent light source relative to the waveguide, and may be dynamically changed, i.e. as a function of time, (x+dx(t), y+dy(t), z+dz(t), θ+dθ(t)). In accordance with this embodiment of the invention, referring now to FIG. 3B, the light spot coupled to the waveguide is laterally (in the (x) or (y) direction), longitudinally in the (z) direction, or angularly (θ) shifted or tilted over time (or vibrated) relative to the waveguide. In another embodiment, the focus of the light spot may be dynamically changed, where the dynamically changing means may include, for example, a) a moveable focus lens through which the primary light 105 passes into the waveguide to produce the light spot, and b) an electro-mechanical actuator coupled to move the lens back and forth to dynamically change the focus of the resulting light spot.

Dynamically changing the light coupling of the primary light 105 (including the amplitude of the vibration and its frequency) may lead to excitation of propagation modes with different spatial distributions thereby generating different speckle patterns inside the waveguide core 100, and thus outside the waveguide core. The amplitude and frequency of vibration may be tuned to suit the particular observer, e.g. the human eye, a camera. This moving speckle pattern overlaps with the scattering zone 103 thereby providing a strong reduction of the first speckle pattern outside the waveguide core. The second scattering structures 104 inside the coating 102 may therefore be absent in this case, or they may be present in order to further increase the overall speckle reduction in the illumination light 107.

The dynamic changing of the light spot or light coupling of the primary light 105 may be achieved by vibrating a mechanical coupling of the coherent light source or the light source itself, relative to the waveguide. Alternatively, a section of the waveguide that is spaced apart from a section in which the scattering structures 103 are located can be vibrated. In this case the waveguide section that is in motion may be positioned "upstream" from the scattering structure 103 (in relation to the direction of propagation of primary light from the source 105). The vibrating means may be, for example, any suitable electro-mechanical actuator that is driven by an electronic circuit.

b) Axial Stretching and/or Compressing of the Waveguide

A dynamic axial strain may be applied to the waveguide. Generating a push/pull dynamic strain in the propagating direction (z) may change the first speckle pattern (generated by the scattering zone 103 inside the waveguide) and also the second speckle pattern (generated by the scattering zone 104 inside the coating 102), thus reducing the overall speckle contrast in the illumination light 107.

The strain may be generated by different kinds of actuators such as a stepper motor, a magnetic actuator, or a piezo-electric actuator. FIGS. 4A and 4B show an embodiment that integrates a piezo-electric actuator. In this case, the waveguide may be coated or surrounded by one or more piezo-electric ceramic disks or rings 109 that are sandwiched by two or more metallic electrodes 110-111 and positioned remote from the scattering structures 103 and 104. The ceramic disks may be substituted by any continuous or discontinuous parts of ceramic as long as it exhibits at least one contact with (or touches) the waveguide (e.g., optical fiber) and at least one contact with (or touches) a holder 112. For instance it can be a half or a quarter of a disk, or one or more single ceramic sticks or rods positioned next to the fiber.

The fiber is positioned between one or more holders (e.g., ferrules or posts) 108 and 112. The fiber may be clamped to at least one of the holders, which can be fixed, and be freely moving through at least another one of the holders. The fiber could be fixed at both of its ends so that both stretching and compression forces may be imparted upon it by the actuator.

When a varying voltage (e.g., switching between V=O and V≠O) is applied to the electrodes 110-111, it may lead to a dynamic axial deformation of the piezo-electric material, in the disk or ring 109—see FIG. 4B. The piezo-electric material may be a ceramic (e.g., ZnO) or any other suitable material exhibiting piezo-electric properties. In one instance, axial motion is blocked on one end by the holder 112 and therefore the force created in the disk 109 may be transferred as a dynamic stretch or compression of the waveguide.

This stretch or compression results in a dynamic superposition of the first speckle pattern that arises from the first scattering structure 103 and that is changing due to the axial stretch and/or compression of the waveguide core 100 along the structure 103 (depicted within the out-coupled light 106 ad dotted lines in FIG. 4B) and a second speckle pattern that arises from the second scattering structure 104, thereby achieving an overall speckle contrast reduction of the final illumination light 107.

c) Transverse Stretching and/or Compression of the Coating

Figure 5A:
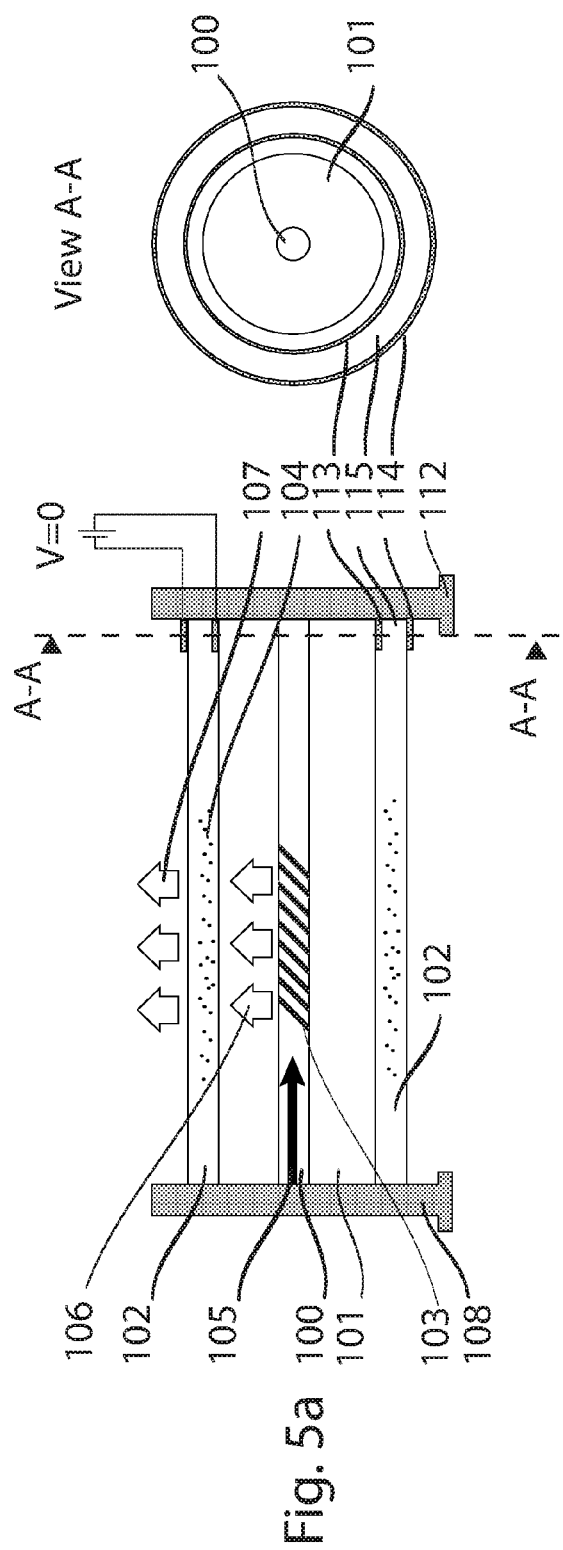
FIG. 5A and FIG. 5B are section views of another coherent light waveguide device with speckle reduction.

In yet another embodiment, a dynamic transverse strain may be applied to the coating 102 of the waveguide. Generating a push/pull motion, e.g. in the transverse direction (y) as seen in FIGS. 5A and 5B, may change the speckle pattern that is generated by the scattering zone 104 inside the coating 102 thus reducing the overall speckle contrast of the illumination light 107.

The strain may be generated by the use of an electro-active material as part of the coating 102. The electro-active material may be e.g., a polymer or a dielectric elastomer. As seen for example in FIG. 5A, the waveguide may be coated with one or several layers of electro-active material 115 that are sandwiched by a pair (or more than one pair) of electrodes 113, 114 stacked on the outer and inner surfaces of part of the electro-active material layers 115 to be actuated. The waveguide (e.g., optical fiber) is positioned between one or more holders (such as ferrules or posts) 108 and 112. The fiber may be clamped to at least one holder.

When a voltage is applied to drive the pair of electrodes 113-114, the electrostatic forces between the electrodes may lead to a decrease or an increase of the thickness of the electro-active material 115 that is directly between the electrodes.

Figure 5B:
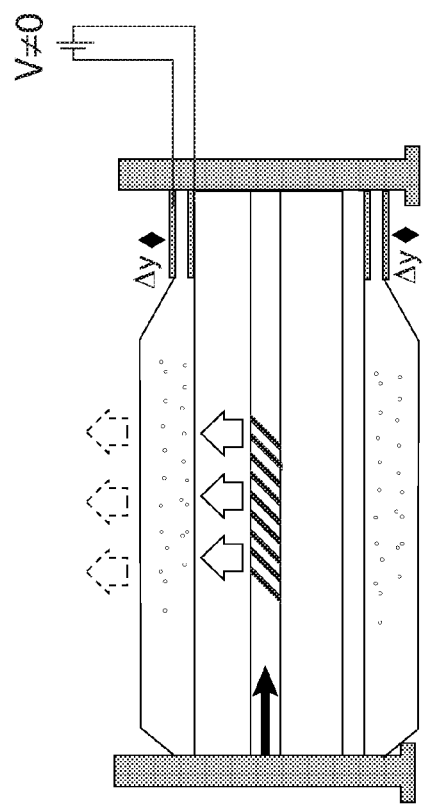

As the fiber is clamped between the two holders, the thickness reduction $\Delta y$ that occurs directly under the pair of electrodes leads to a thickness increase in a location that is remote from the electrodes, as illustrated in FIG. 5B. This latter thickness increase changes the distribution of the scattering centers 104 which are positioned in the optical path of the out-coupled light 106 and thus dynamically changes the speckle pattern of the out-coupled light 106.

This results in a dynamic superposition of the first speckle pattern that arises from the first scattering structure 103 (in out-coupled light 106) and the second speckle pattern arising from the second scattering structure 104, thereby yielding an overall speckle contrast reduction of the final illumination light 107.

Static Reduction

In accordance with another embodiment of the invention, an illumination device with reduced speckle noise in the illumination light 107 may be designed, by adapting the size, the refractive index and the concentration of the scattering particles forming the second scattering zone 104 that is inside the coating 102 of the waveguide, or/and the size, the refractive index and the concentration of the first scattering zone 103 so that multiple speckle pattern and polarization states are generated inside one of these scattering zones. This is referred to as a "static" solution because it does not require any relative motion between the speckle sources during operation of the illumination device. In one embodiment, the particle sizes of the second scattering zone, the first scatting zone, or both may be in the range of 1 to 30 microns and a concentration of under 10% in volume. In another embodiment, the particle sizes of the second scattering zone, may be of the order of microns up to several hundreds of micron and a concentration of under 30% in volume. Other particle size and concentrations may be possible.

FIGS. 6A and 6B show two different embodiments where the coating 102 has integrated therein small sized scattering centers (FIG. 6B) and large sized scattering centers (FIG. 6A). In the case of small sized scattering centers (FIG. 6B), the out-coupled light 106 meets with a larger number of scattering centers (higher concentration of scattering centers) in its optical path. The depolarization effect may therefore be stronger and the superposition of multiple speckles patterns may contribute to a reduced speckle contrast. As a side consequence, the use of smaller sized scattering centers (FIG. 6B) may lead to a larger diffusion angle $\alpha$ (alpha) relative to the case where larger sized scattering centers are used (FIG. 6A).

Adapting the size of the particles that are dispersed in the material of the coating 102, their density and refractive index (forming the scattering zones 104), the overall refractive index of the coating 102, as well as the thickness of the coating 102 enables control of both the speckle contrast and the angle $\alpha$ of the illumination light 107, as illustrated in FIG. 6A and FIG. 6B.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For instance, in all the figures mentioned, the scattering zones or centers 103 inside the waveguide are represented as a tilted grating and the scattering zones or centers 104 in the coating are represented by particles. The invention however is not limited to these types or combination of scattering centers. The description is thus to be regarded as illustrative instead of limiting.

What is claimed is:

1. A waveguide apparatus for an illumination system, comprising:
    a waveguide in which coherent light is to propagate along its longitudinal axis, the waveguide having formed therein a first scattering zone that runs along the longitudinal axis and that is to scatter the propagating coherent light out of the waveguide at a non-zero angle relative to the longitudinal axis; and
    an electro-active coating outside the waveguide having formed therein a second scattering zone that is positioned to receive the scattered light from the first scattering zone; and
    means for applying a voltage to drive the electro-active coating that causes the coating, to change its shape, thereby reducing overall speckle contrast when light that is scattered out of the coating illuminates a nearby surface.

2. The apparatus of claim 1 wherein the second scattering zone contains photo-luminescence particles.

3. The waveguide apparatus of claim 1 wherein the coating is formed on an outer surface the waveguide.

4. The waveguide apparatus of claim 3 wherein the electro-active coating, when driven with a voltage, is to cause the waveguide to stretch or compress in a direction that is transverse to the longitudinal axis to reduce overall speckle contrast of the light that is being scattered out of the waveguide and that illuminates a nearby surface.

5. The waveguide apparatus of claim 1 wherein the coating is spaced apart from an outer surface of the waveguide.

6. The waveguide apparatus of claim 5 wherein the electro-active coating, when driven with a voltage, is to cause the waveguide to stretch or compress in a direction that is transverse to the longitudinal axis to reduce overall speckle contrast of the light that is being scattered out of the waveguide and that illuminates a nearby surface.

7. The waveguide apparatus of claim 1 wherein the electro-active coating, when driven with a voltage, is to cause the waveguide to stretch or compress in a direction that is transverse to the longitudinal axis to reduce overall speckle contrast of the light that is being scattered out of the waveguide and that illuminates a nearby surface.

8. A method for producing illumination, the method comprising:

sending coherent light into a waveguide in which the coherent light is to propagate along a longitudinal axis of the waveguide, the waveguide having formed therein a first scattering zone that runs along the longitudinal axis and that is to scatter the propagating coherent light out of the waveguide at a non-zero angle relative to the longitudinal axis; and applying a voltage to drive an electro-active coating outside the waveguide that has formed therein a second scattering zone that is positioned to receive scattered light from the first scattering zone, wherein the applied voltage causes the electro-active coating to change its shape and thereby reduce overall speckle contrast when light that is scattered out of the coating illuminates a nearby surface.

9. The method of claim 8 wherein the second scattering zone contains photo-luminescence particles.

10. The method of claim 8 wherein the coating is formed on an outer surface the waveguide.

11. The method of claim 10 wherein the electro-active coating, when driven with the voltage, causes the waveguide to stretch or compress in a direction that is transverse to the longitudinal axis to reduce overall speckle contrast of light that is being scattered out of the waveguide and that illuminates the nearby surface.

12. The method of claim 8 wherein the coating is spaced apart from an outer surface of the waveguide.

13. The method of claim 12 wherein the electro-active coating, when driven with the voltage, is to cause the waveguide to stretch or compress in a direction that is transverse to the longitudinal axis to reduce overall speckle contrast of the light that is being scattered out of the waveguide and that illuminates a nearby surface.

14. The method of claim 8 wherein the electro-active coating, when driven with a voltage, is to cause the waveguide to stretch or compress in a direction that is transverse to the longitudinal axis to reduce overall speckle contrast of the light that is being scattered out of the waveguide and that illuminates a nearby surface.

* * * * *